(12) United States Patent
Bortz et al.

(10) Patent No.: US 9,027,097 B2
(45) Date of Patent: May 5, 2015

(54) CLIENT APPLICATION ASSISTED AUTOMATIC USER LOG IN

(71) Applicant: Dropbox, Inc., San Francisco, CA (US)

(72) Inventors: Andrew Bortz, San Francisco, CA (US); Ambrus Csaszar, San Francisco, CA (US); David Euresti, San Francisco, CA (US); Dwayne Litzenberger, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 74 days.

(21) Appl. No.: 13/760,587

(22) Filed: Feb. 6, 2013

(65) Prior Publication Data

US 2014/0223527 A1 Aug. 7, 2014

(51) Int. Cl.
*H04L 29/06* (2006.01)
*H04L 9/32* (2006.01)

(52) U.S. Cl.
CPC ............ *H04L 63/08* (2013.01); *H04L 63/0807* (2013.01); *H04L 9/3228* (2013.01); *H04L 63/0815* (2013.01); *H04L 9/3213* (2013.01)

(58) Field of Classification Search
CPC ............ H04L 63/0807; H04L 63/0815; H04L 9/3213; H04L 9/3228
See application file for complete search history.

(56) References Cited

U.S. PATENT DOCUMENTS

| | | | | |
|---|---|---|---|---|
| 6,360,254 | B1 * | 3/2002 | Linden et al. | 709/219 |
| 7,240,192 | B1 * | 7/2007 | Paya et al. | 713/152 |
| 7,478,434 | B1 * | 1/2009 | Hinton et al. | 726/27 |
| 7,954,140 | B2 * | 5/2011 | Badenell et al. | 726/8 |
| 8,335,933 | B2 * | 12/2012 | Humphrey et al. | 713/193 |
| 8,478,989 | B2 * | 7/2013 | Lynch et al. | 713/155 |
| 8,560,841 | B2 * | 10/2013 | Chin et al. | 713/159 |
| 8,856,887 | B2 * | 10/2014 | Field-Eliot et al. | 726/4 |
| 2006/0182283 | A1 * | 8/2006 | Sandhu et al. | 380/286 |
| 2012/0109829 | A1 * | 5/2012 | McNeal et al. | 705/67 |
| 2013/0191638 | A1 * | 7/2013 | Spector et al. | 713/168 |
| 2013/0215839 | A1 * | 8/2013 | Heo et al. | 370/329 |
| 2013/0262867 | A1 * | 10/2013 | Evancich et al. | 713/168 |
| 2013/0263211 | A1 * | 10/2013 | Neuman et al. | 726/1 |
| 2014/0037092 | A1 * | 2/2014 | Bhattacharya et al. | 380/259 |

\* cited by examiner

*Primary Examiner* — Victor Lesniewski
(74) *Attorney, Agent, or Firm* — Novak Druce Connolly Bove + Quigg LLP

(57) ABSTRACT

Some systems allow a user to access content using both a native client application and a web interface. In these systems, the client application authorized to access a user account can assist with automatically logging a user into the web interface through the use of authentication tokens. In response to an authentication request, the client application can select a token and split it into multiple parts. One piece can be embedded in a URL and a second piece can be stored in a file. The file can also contain browser executable instructions that when executed combine the two pieces to re-create the token and send the re-created token to a server to authenticate the user. The client application can forward the URL to the browser, which can direct the browser to the file. The browser can execute the instructions thereby authenticating the user.

24 Claims, 9 Drawing Sheets

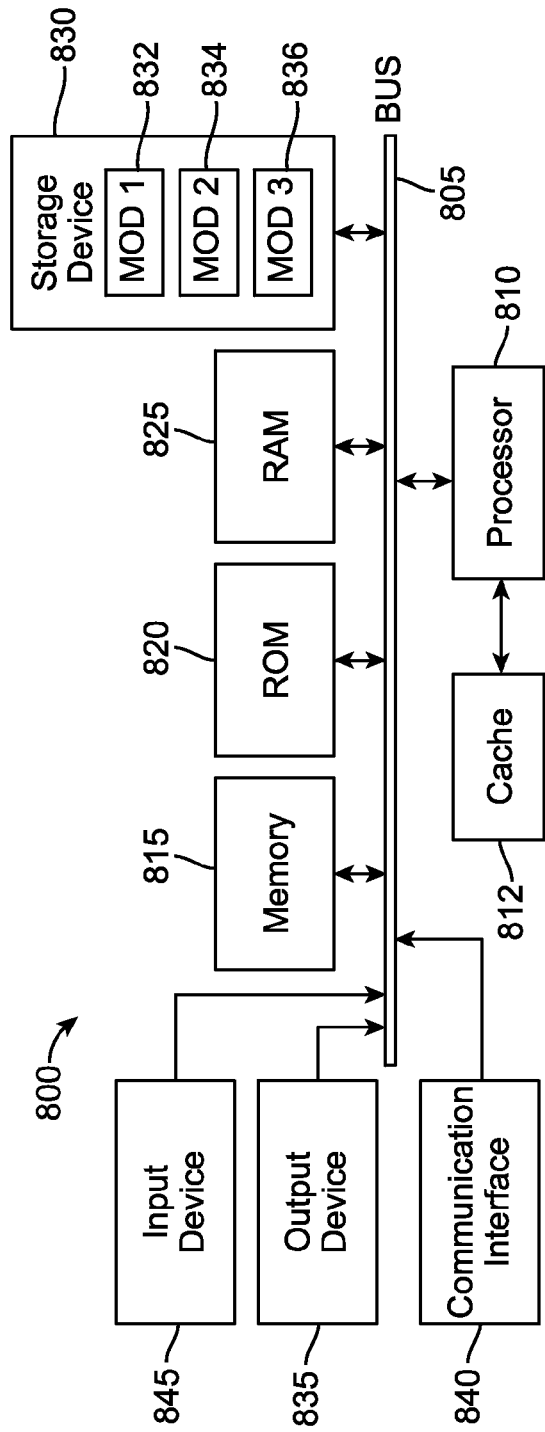
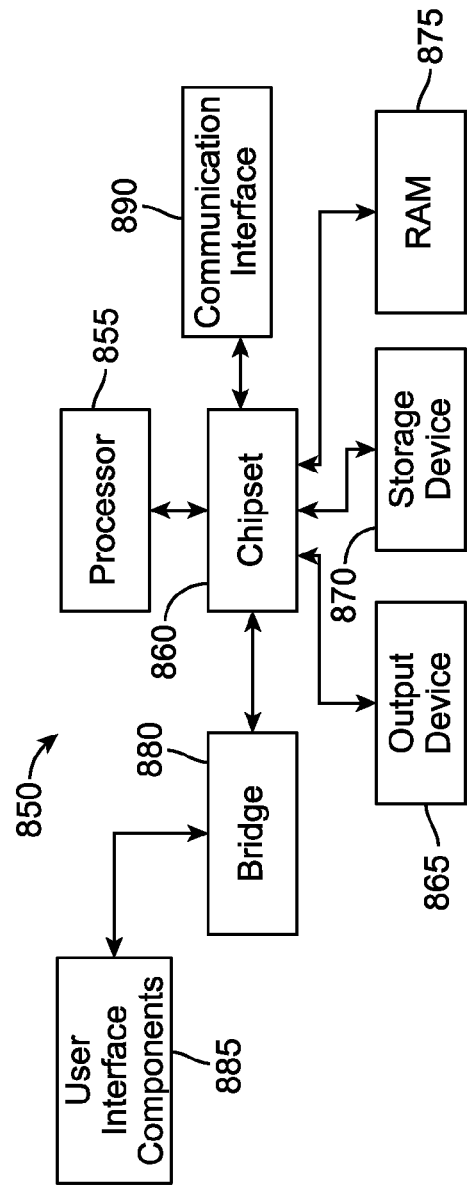
FIG. 8A
FIG. 8B

CLIENT APPLICATION ASSISTED AUTOMATIC USER LOG IN

TECHNICAL FIELD

The present technology pertains to authenticating a user with a website, and more specifically pertains to an improved technique for logging a user into a website using a native client application to authorize the user such that when the user visits the website the user is already logged in.

BACKGROUND

Many services can be accessed using both a native client application and a web interface. For example, a user may be able to access files stored in an online file storage system using both a client application provided by the storage service that is installed on the user's device and through a web browser. Some systems may provide only a subset of functionality through either the client application or the web interface. In these configurations a user may be able to initiate a particular feature from an interface where the feature is not actually available and the initiation action can result in activation of the feature on the other interface. For example, a user may initiate an account settings feature from the client application. This action would result in automatically opening a web browser with the account settings page loaded.

To present user account specific features through a web interface, the user generally must be authenticated with the server. A way to accomplish this is to present the user with a log in page prior to presenting the requested feature. This is a viable approach, but it degrades the user experience. A better user experience could use the fact that the user is already authenticated on the client application to automatically authenticate the user through the web interface. A straightforward technique for logging a user in to a website using a client application to authenticate the user is to pass the authentication information, such as the user's password, in a uniform resource locator (URL). However, this approach has a number of security issues. One important security problem is that anyone with access to the URL can use it to access the user's account. For example, if the user posts the URL to a social media site anyone can use the URL to log in to the user's account.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for client application assisted log in. Some online content management systems provide a user with a native client application and a web interface for accessing features provided by the content management system. In those content management systems, an authenticated client application can send information to a web browsers on a same client device to log a user in to the content management system's website without requiring a user to provide log in credentials. To perform the automatic log in, the client application can receive one or more one-time use authentication tokens from the content management system's server. The authentication tokens can be specific to the user account authorized on the client application.

When it is time to log the user in to the website, the client application can obtain an authentication token and split it into multiple parts. The authentication token can be split using a variety of techniques, such as a secret sharing algorithm. After splitting the authentication token, the client application can place one part of the authentication token in a URL. The other part of the authentication token can be stored in a file that also contains instructions, which when executed combine the first and second parts of the authentication token to re-create the authentication token and transmit the re-created authentication token to the server.

After generating the URL and the file, the client application can then activate the web browser and forward the URL to the web browser, thereby instructing the web browser to navigate to the file. The web browser can execute the instructions, causing the two pieces of the authentication token to be re-combined and transmitted to the server. For example, the file can contain JavaScript instructions that recombine the parts and call the HTTP POST method. The POST method can transfer the re-created authentication token to the server. Other computer executable instructions can also be used to re-combine the authentication token and transfer the authentication token to the server through the web browser. Once the authentication token is used to authenticate a user, the server can invalidate the authentication token. Likewise, if the authentication token is not used prior to expiration, the authentication token can be invalidated.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 shows a transfer of information between a client application, a web browser, and content management system during client application assisted log in;

FIG. 8A shows a conventional system bus computing system architecture; and

FIG. 8B shows a computer system having a chipset architecture.

DETAILED DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

Figure 1A:
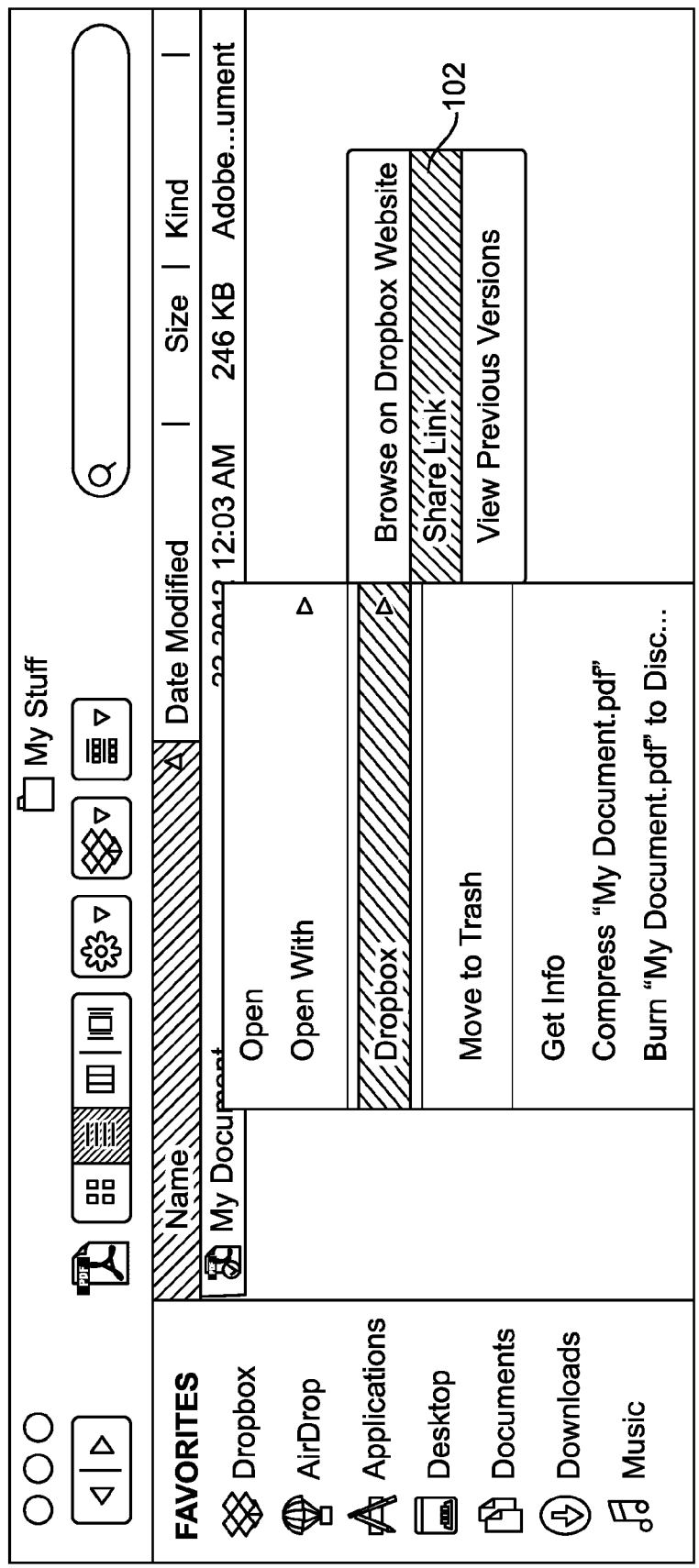
FIGS. 1A and 1B show an exemplary scenario of a user initiating, through a client application, a feature that requires functionality only available through a web browser.
Figure 1B:
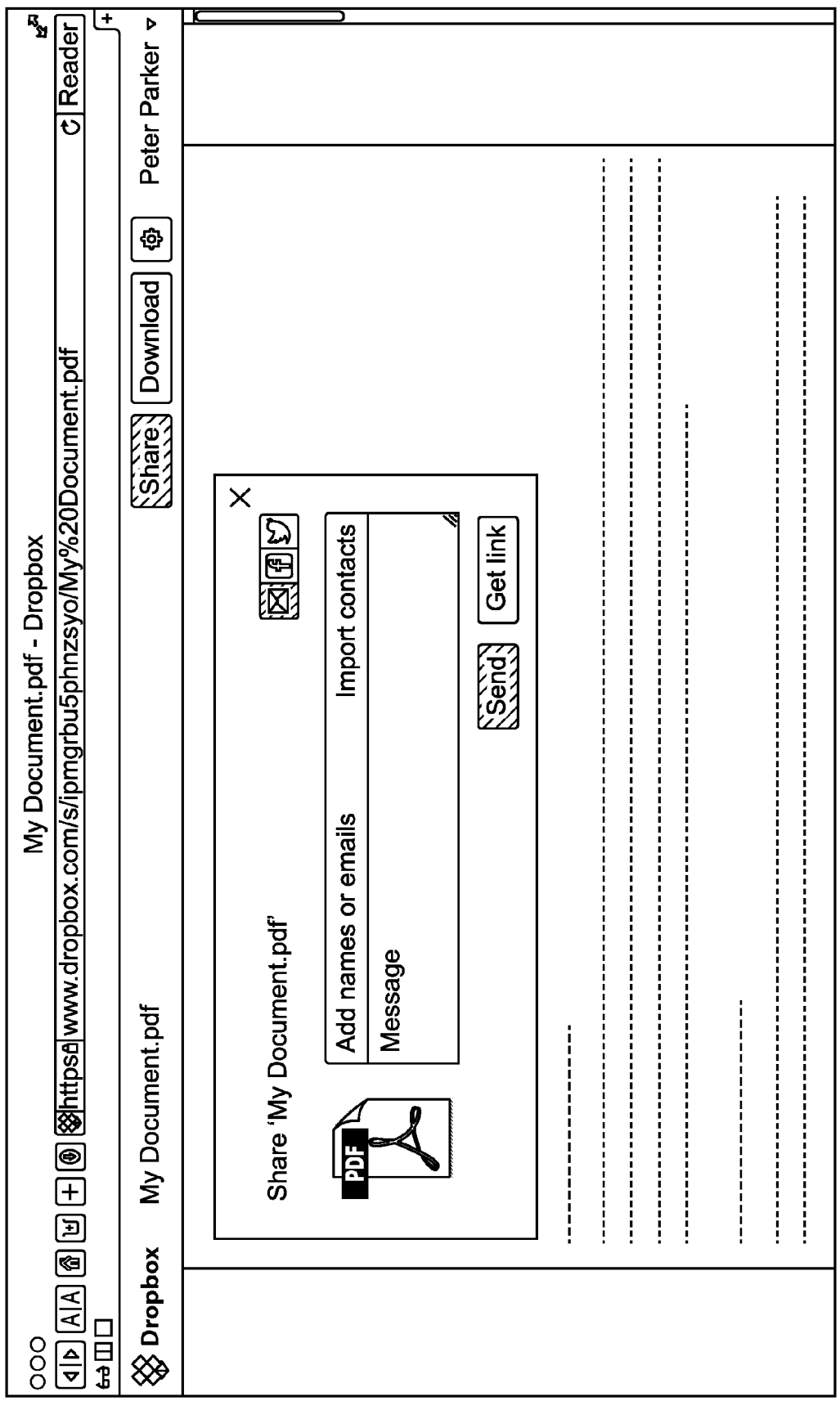

The disclosed technology addresses the need in the art for an improved technique for logging a user in to a website using a native client application such that when the user navigates to or is directed to the website the user is already logged in. Some systems provide a user with a native client application and web interface for accessing features provided by the system. Depending on the feature, it may make more sense to only offer the feature through one interface. However, to improve the user experience, an interface may include functionality that allows a user to initiate a feature from an interface where the feature is not actually available. The user action can then cause the other interface to be activated and the feature to be presented on it. For example, a user could initiate a feature from the client application, which can cause a web browser to open displaying the feature. FIGS. 1A and 1B show such a scenario. FIG. 1A shows a Dropbox™ client application from Dropbox Inc. of San Francisco, Calif. In this scenario, the user would like to share a link to a file, so the user selects share link option 102 in the client application. The share link feature requires functionality only provided through the web interface. Therefore, in response to the user selecting share link option 102 in the client application, the client application can forward the request to the web browser installed on the client device where the share link request can be completed. FIG. 1B show the result of the share link request in the web browser.

If the feature requested through the client application requires access to data specific to a user account, then prior to displaying the feature in the web browser, the user has to be logged in to their account. A technique to accomplish this is to present the user with an authentication page prior to presenting the requested feature in the web browser. However, if the user account is already authorized on the client application, the client application can be used to authorize the user on the website.

The disclosed technology enables a client application to automatically log a user in to a website. To perform the automatic authentication, the client application can receive one or more one-time use secrets from the system's server. The secrets can be specific to the user account authorized on the client application. When it is time to log the user in to the website, the client application can select a secret and provide the secret to the web browser, which can in turn send the secret to the server. The server can verify the secret and return an appropriate verification response, such as a webpage displaying the requested feature or an authentication failed page.

The secret can be used in a number of different ways to log the user in to the website. In a first client application assisted log in technique the client application can construct a uniform resource locator (URL) and embed the secret in the URL. The client application can then forward the URL to the web browser where the web browser can use the URL to send the secret to the server. While this log in technique can be used to automatically log a user in to a website, the URL can be exploited to give others access to a user's account.

To illustrate how the URL can be exploited to give others access, consider the following scenario. A user selects a feature from a client application interface, such as share a link to a content item. The client application generates an authentication URL containing a secret. The authentication URL is forwarded to the web browser, and the web browser presents a browser window in the foreground where the authentication URL is temporarily visible in the authentication URL bar. The user has a slow Internet connection and does not realize that the authentication URL is not the link to the user's content item, but is instead a temporary URL used for authentication. Before the authentication URL is replaced with the link to the user's content item, the user copies the authentication URL and posts it to a social media site. Now recipients of the post can paste the authentication URL in a web browser and gain full access to the user's account, not access to a particular content item as the user intended. A way to minimize the damage caused in such a scenario is to assign an expiration period to the secret. However, because the expiration period must be long enough to allow a user with a slow Internet connection to communicate the secret to the server, the expiration period may not be short enough to prevent access by other users.

The secret can be used in a second client application assisted log in technique that addresses the URL exploit disclosed above. In the second client application assisted log in technique the client application can create a file containing the secret and instructions, such as JavaScript instructions, which when executed can transmit the secret to the server. The client application can then activate the web browser, and instruct the web browser to navigate to the file. The web browser can execute the instructions, causing the secret to be transmitted to the server. For example, the file can contain JavaScript instructions that call the hypertext transfer protocol (HTTP) POST method. The POST method can transfer the secret to the server. Other computer executable instructions can also be used to transfer the secret to the server through the web browser. As with the first client application assisted log in technique, this technique may also be vulnerable if the file is stolen from the user's device before the secret expires.

To provide a client application assisted log in technique that address both of the vulnerabilities disclosed above, the present technology can combine the first and second client assisted log in techniques by splitting the secret between the authentication URL and the file. In response to an authentication request, the client application can obtain a secret and split it into two parts. The secret can be split using a variety of techniques, such as a secret sharing algorithm. After splitting the secret, the client application can place one part of the secret in a URL. The other part of the secret can be stored in a file that also contains instructions, which when executed combine the first and second parts of the secret to re-create the secret and transmit the re-created secret to the server.

After generating the URL and the file, the client application can then activate the web browser and forward the URL to the web browser, thereby instructing the web browser to navigate to the file. The web browser can execute the instructions, causing the two pieces of the secret to be re-combined and transmitted to the server. For example, the file can contain JavaScript instructions that recombine the parts and call the HTTP POST method. The POST method can transfer the re-created secret to the server. Other computer executable instructions can also be used to re-combine the secret and transfer the secret to the server through the web browser.

The secret can be any type of value generated by the server that is uniquely linked to a user account. For example, the secret can be an authentication token. Additionally, the secret can be a one-time use secret with an assigned expiration period. Once the secret is used to authenticate a user, the server can invalidate the secret. Likewise, if the secret is not used prior to expiration, the secret can be invalidated.

Additionally, while the disclosed technology is discussed in terms of authenticating a user, and thus passing authentication information from a native client application to a web browser, the technique can be used for communicating any secret information between multiple applications.

Figure 2:
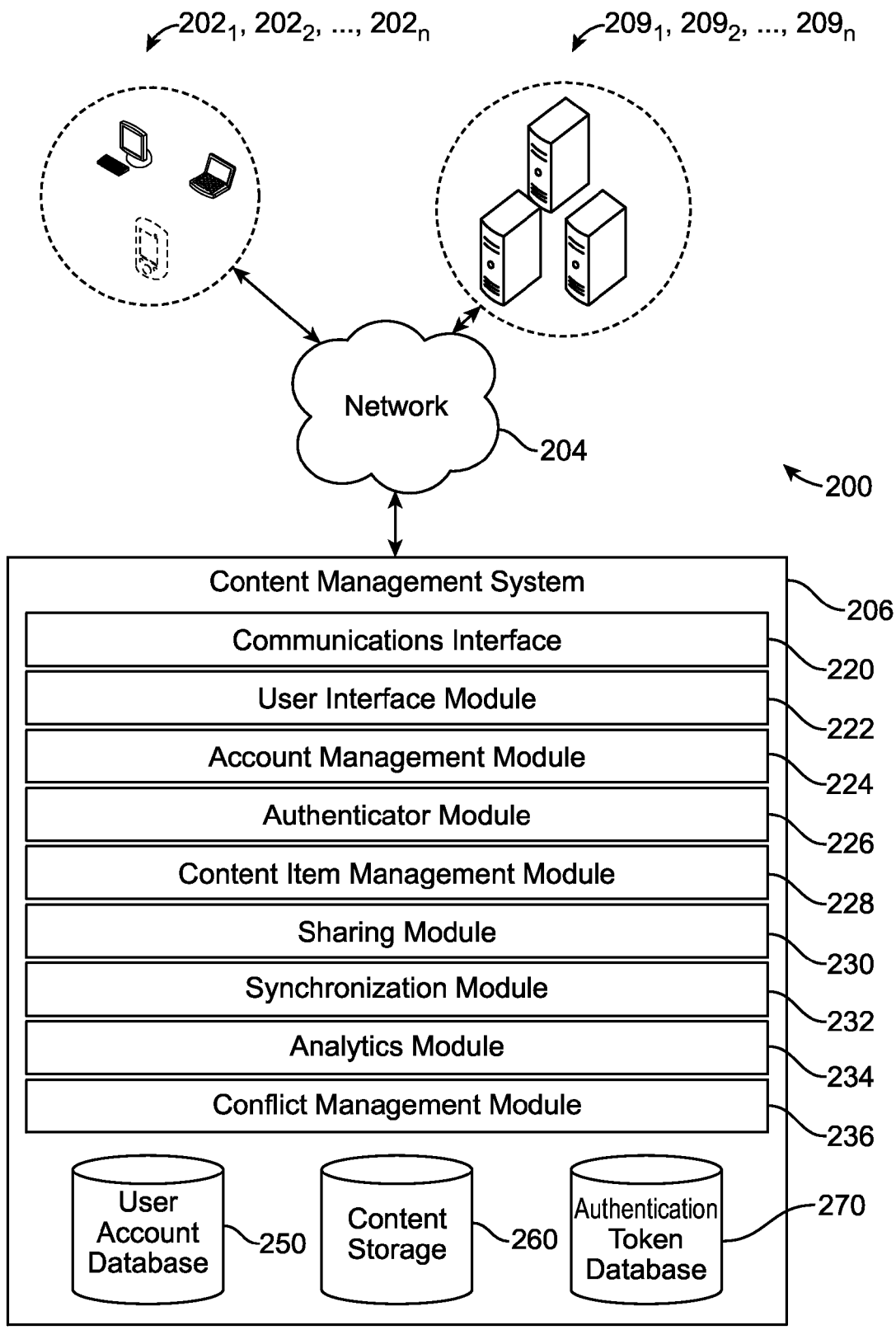
FIG. 2 shows an exemplary configuration of devices and a network in accordance with the invention.

Having disclosed a technique for client application assisted log in, the disclosure not turns to an exemplary system configuration that can be employed to practice the concepts disclosed herein. Exemplary system configuration 200 is shown in FIG. 2, wherein electronic devices communicate via a network for purposes of exchanging content and other data. System 200 can be configured for use on a wide area network such as that illustrated in FIG. 2. However, the present principles are applicable to a wide variety of network configurations that facilitate the intercommunication of electronic devices, such as a local area network, wireless network, etc. For example, each of the components of system 200 in FIG. 2 can be implemented in a localized or distributed fashion in a network.

In system 200, a user can interact with content management system 206 through client devices $202_1, 202_2, \ldots, 202_n$ (collectively "202") connected to network 204 by direct and/or indirect communication. Content management system 206 can support connections from a variety of different client devices, such as desktop computers; mobile computers; mobile communications devices, e.g. mobile phones, smart phones, tablets; smart televisions; set-top boxes; and/or any other network enabled computing devices. Client devices 202 can be of varying type, capabilities, operating systems, etc. Furthermore, content management system 206 can concurrently accept connections from and interact with multiple client devices 202.

A user can interact with content management system 206 via a client-side application installed on client device $202_i$. In some embodiments, the client-side application can include a content management system specific component. For example, the component can be a stand-alone application, one or more application plug-ins, and/or a browser extension. However, the user can also interact with content management system 206 via a third-party application, such as a web browser, that resides on client device $202_i$ and is configured to communicate with content management system 206. In either case, the client-side application can present a user interface (UI) for the user to interact with content management system 206. For example, the user can interact with the content management system 206 via a client-side application integrated with the file system or via a webpage displayed using a web browser application.

Content management system 206 can make it possible for a user to store content, as well as perform a variety of content management tasks, such as retrieve, modify, browse, and/or share the content. Furthermore, content management system 206 can make it possible for a user to access the content from multiple client devices 202. For example, client device $202_i$ can upload content to content management system 206 via network 204. The content can later be retrieved from content management system 206 using the same client device $202_i$ or some other client device 202.

To facilitate the various content management services, a user can create an account with content management system 206. The account information can be maintained in user account database 250. User account database 250 can store profile information for registered users. In some cases, the only personal information in the user profile can be a username and/or email address. However, content management system 206 can also be configured to accept additional user information.

User account database 250 can also include account management information, such as account type, e.g. free or paid; usage information, e.g. file edit history; maximum storage space authorized; storage space used; content storage locations; security settings; personal configuration settings; content sharing data; etc. Account management module 224 can be configured to update and/or obtain user account details in user account database 250. The account management module 224 can be configured to interact with any number of other modules in content management system 206.

An account can be used to store content, such as documents, text files, audio files, video files, etc., from one or more client devices 202 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 260. Content storage 260 can be a storage device, multiple storage devices, or a server. Alternatively, content storage 260 can be a cloud storage provider or network storage accessible via one or more communications networks. Content management system 206 can hide the complexity and details from client devices 202 so that client devices 202 do not need to know exactly where the content items are being stored by content management system 206. In one variation, content management system 206 can store the content items in the same folder hierarchy as they appear on client device $202_i$. However, content management system 206 can store the content items in its own order, arrangement, or hierarchy. Content management system 206 can store the content items in a network accessible storage (SAN) device, in a redundant array of independent disks (RAID), etc. Content storage 260 can store content items using one or more partition types, such as FAT, FAT32, NTFS, EXT2, EXT3, EXT4, ReiserFS, BTRFS, and so forth.

Content storage 260 can also store metadata describing content items, content item types, and the relationship of content items to various accounts, folders, or groups. The metadata for a content item can be stored as part of the content item or can be stored separately. In one variation, each content item stored in content storage 260 can be assigned a system-wide unique identifier.

Content storage 260 can decrease the amount of storage space required by identifying duplicate files or duplicate segments of files. Instead of storing multiple copies, content storage 260 can store a single copy and then use a pointer or other mechanism to link the duplicates to the single copy. Similarly, content storage 260 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 206 can be configured to support automatic synchronization of content from one or more client devices 202. The synchronization can be platform agnostic. That is, the content can be synchronized across multiple client devices 202 of varying type, capabilities, operating systems, etc. For example, client device $202_i$ can include client software, which synchronizes, via a synchronization module 232 with content management system 206, content in client device $202_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 206. Conversely, the background process can identify content that has been updated at content management system 206 and synchronize those changes to the local folder. The client software can provide notifications of synchronization operations, and can provide indications of content statuses directly within the content management application. Sometimes client device $202_i$ may not have a network connection available. In this scenario, the client software can monitor the linked folder for file changes and queue those changes for later synchronization to content management system 206 when a network connection is available. Similarly, a user can manually stop or pause synchronization with content management system 206.

A user can also view or manipulate content via a web interface generated and served by user interface module 222. For example, the user can navigate in a web browser to a web address provided by content management system 206. Changes or updates to content in the content storage 260 made through the web interface, such as uploading a new version of a file, can be propagated back to other client devices 202 associated with the user's account. For example, multiple client devices 202, each with their own client software, can be associated with a single account and files in the account can be synchronized between each of the multiple client devices 202.

Content management system 206 can include a communications interface 220 for interfacing with various client devices 202, and can interact with other content and/or service providers $209_1, 209_2, \ldots, 209_n$ (collectively "209") via an Application Programming Interface (API). Certain software applications can access content storage 260 via an API on behalf of a user. For example, a software package, such as an app on a smartphone or tablet computing device, can programmatically make calls directly to content management system 206, when a user provides credentials, to read, write, create, delete, share, or otherwise manipulate content. Similarly, the API can allow users to access all or part of content storage 260 through a web site.

Content management system 206 can also include authenticator module 226, which can verify user credentials, security tokens, API calls, specific client devices, and so forth, to ensure only authorized clients and users can access files. Authenticator module 226 can be configured to generate one or more one-time use secrets or authentication tokens for a user account. Authenticator module 226 can assign an expiration period or date to each authentication token. In addition to sending the authentication tokens to requesting client devices, authenticator module 226 can store generated authentication tokens in authentication token database 270. Upon receiving a request to validate an authentication token, authenticator module 226 can check authentication token database 270 for a matching authentication token assigned to the user. Once authenticator module 226 identifies a matching authentication token, authenticator module 226 can check if the matching authentication token is still valid. For example, authenticator module 226 can verify that the authentication token has not expired or was not marked as used or invalid. After validating an authentication token, authenticator module 226 can invalidate the matching authentication token. For example, authenticator module 226 can mark the matching authentication token as used or invalid, or delete the matching authentication token from authentication token database 270.

Further, content management system 206 can include analytics module 234 that can track and report on aggregate file operations, user actions, network usage, total storage space used, as well as other technology, usage, or business metrics. A privacy and/or security policy can prevent unauthorized access to user data stored with content management system 206.

Content management system 206 can include sharing module 230 for managing sharing content publicly or privately. Sharing content publicly can include making the content item accessible from any computing device in network communication with content management system 206. Sharing content privately can include linking a content item in content storage 260 with two or more user accounts so that each user account has access to the content item. The sharing can be performed in a platform agnostic manner. That is, the content can be shared across multiple client devices 202 of varying type, capabilities, operating systems, etc. The content can also be shared across varying types of user accounts.

In some embodiments, content management system 206 can include a content management module 228 for maintaining a content directory. The content directory can identify the location of each content item in content storage 260. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 206 can use the content path to present the content items in the appropriate folder hierarchy.

A content entry can also include a content pointer that identifies the location of the content item in content storage 260. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 230 can be configured to add a user account identifier to the content entry associated with the content item, thus granting the added user account access to the content item. Sharing module 230 can also be configured to remove user account identifiers from a content entry to restrict a user account's access to the content item.

To share content publicly, sharing module 230 can be configured to generate a custom network address, such as a URL, which allows any web browser to access the content in content management system 206 without any authentication. To accomplish this, sharing module 230 can be configured to include content identification data in the generated URL, which can later be used to properly identify and return the requested content item. For example, sharing module 230 can be configured to include the user account identifier and the content path in the generated URL. Upon selection of the URL, the content identification data included in the URL can be transmitted to content management system 206 which can use the received content identification data to identify the appropriate content entry and return the content item associated with the content entry.

In addition to generating the URL, sharing module 230 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 230 can be configured to change the value of the flag to 1 or true after generating a URL to the content item.

In some embodiments, sharing module 230 can also be configured to deactivate a generated URL. For example, each content entry can also include a URL active flag indicating whether the content should be returned in response to a request from the generated URL. For example, sharing module 230 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 230 can reactivate the URL by again changing the value of the URL active flag to 1 or true. A user can thus easily restore access to the content item without the need to generate a new URL.

While content management system 206 is presented with specific components, it should be understood by one skilled in the art, that the architectural configuration of system 206 is simply one possible configuration and that other configurations with more or less components are also possible. For example, user account database 250 and authentication token database 270 can be a single database.

Figure 3:
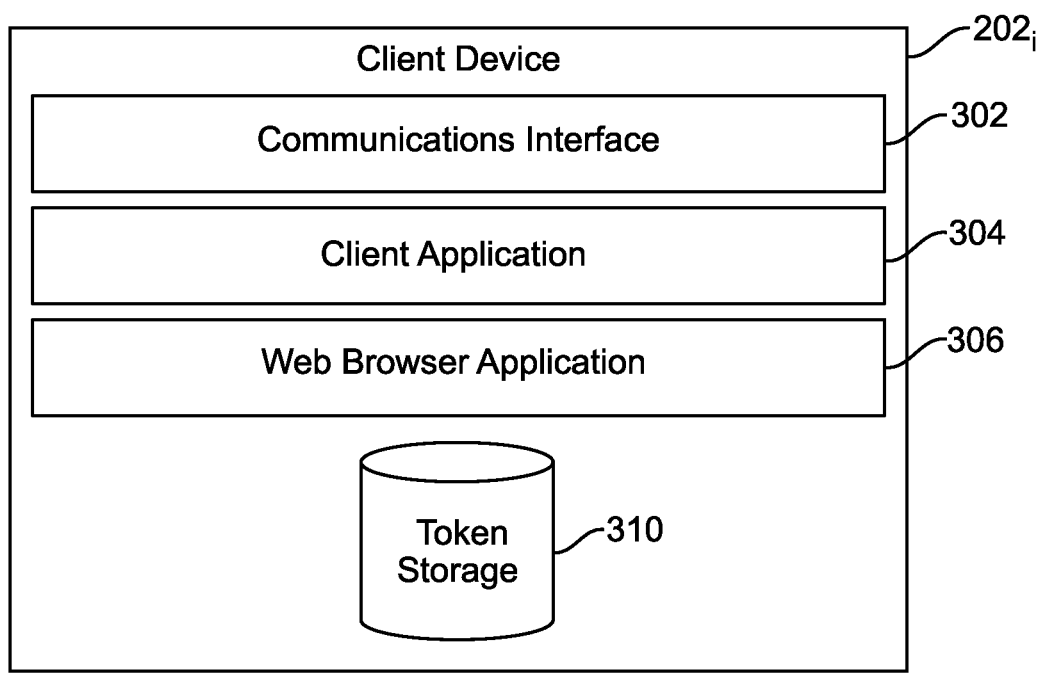
FIG. 3 shows an exemplary configuration of a client device.

FIG. 3 shows an exemplary configuration of a client device $202_i$. As disclosed above, client device $202_i$ can include a number of components and/or client side applications for accessing functionality provided by content management system 206. The components and/or applications can include one or more databases or storage structures for storing data relevant to the operation of the system, e.g. token storage 310, and one or more modules and/or client applications for interacting with the storage structures and/or controlling the features provided by content management system 206, e.g. communications interface 302, content management client application 304, and web browser 306. Each of the components in FIG. 3 is discussed in more detail below; however, it should be understood by one skilled in art, that the architectural configuration illustrated in FIG. 3 is simply one possible configuration and that other configurations with more or less components are also possible.

Client device $202_i$ can include content management client application 304, which can include functionality specific to content management system 206. The functionality can include functionality for client application assisted website log in. Client application 304 can communicate with content management system 206, such as through communications interface 302, to request one or more one-time use authentication tokens. Client application 304 can also include functionality to select an authentication token, split it into multiple parts, and then generate a URL and a file each containing a part of the token. Furthermore, client application 304 can include functionality to activate a web browser installed on client device 202.

Client device $202_i$ can also include web browser application 306 that can be used to communicate with content management system 206, such as through communications interface 302. In some cases, web browser application 306 can communicate with content management system 206 using HTTP. Web browser 306 can be configured to execute client-side scripting languages, such as JavaScript, or other web browser executable languages, and then transmit the results to content management system 206. Furthermore, web browser application 306 can receive authentication responses from content management system 206, such as responses specific to a successful or failed authentication.

Figure 4:
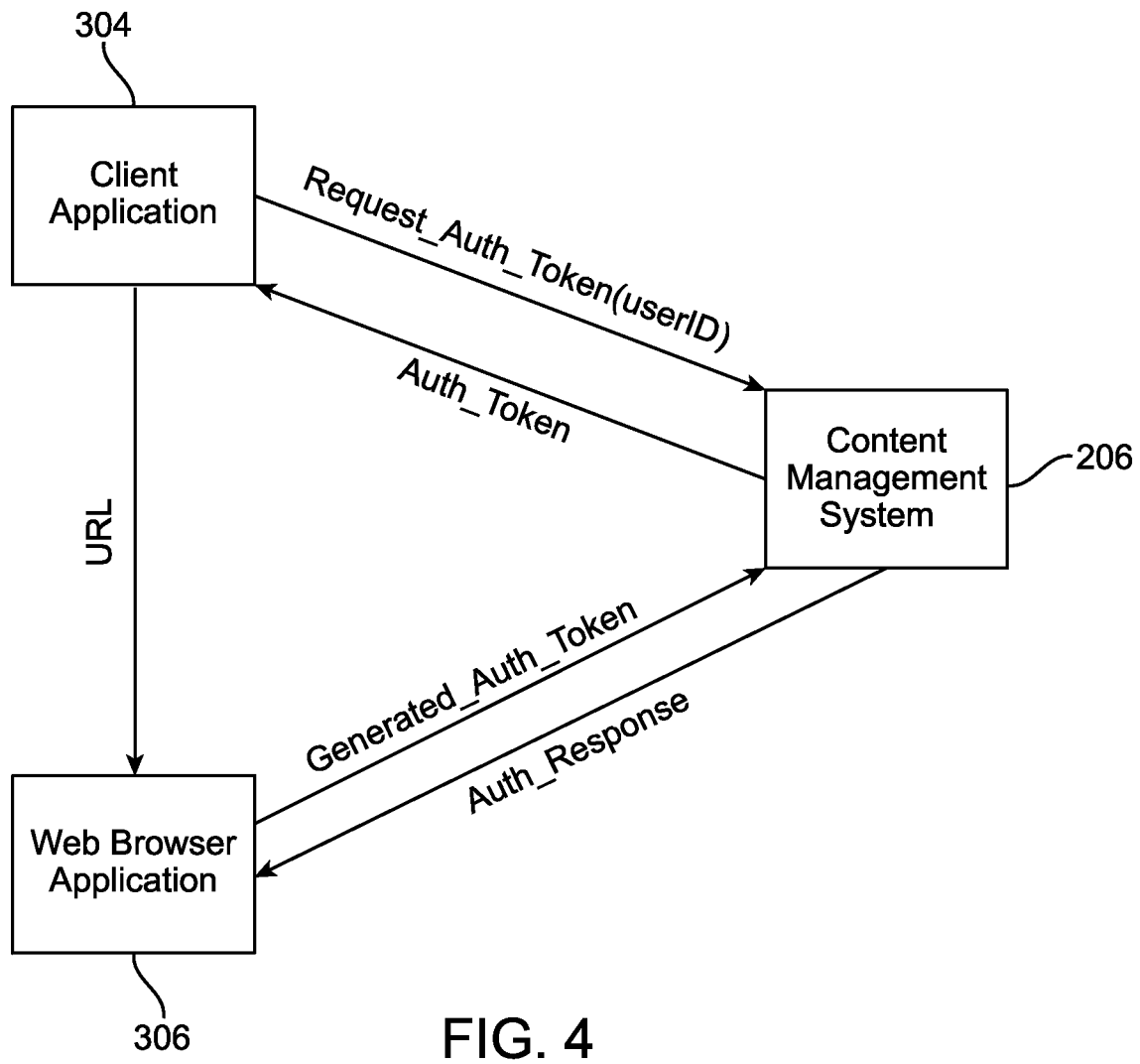

FIG. 4 shows a transfer of information between client application 304, web browser 306, and content management system 206 during client application assisted log in. Client application 304 can maintain two-way communication with content management system 206 for the purpose of requesting and receiving one or more authentication tokens. Client application 304 can request one or more authentication tokens from content management system 206. As part of the request, client application 304 can include a unique user identifier that content management system 206 can use to identify the user account for which the one or more authentication tokens should be generated. In response to the request, content management system 206 can generate or otherwise obtain one or more authentication tokens specific to the user account and send them to client application 304.

Client application 304 can also send information to web browser application 306. In response to an authentication request, client application 304 can generate a URL containing a part of the authentication token. Client application 304 can then push or forward the URL to web browser application 306.

Web browser application 306 can maintain two-way communication with content management system 206 for the purpose of sending a re-created authentication token and receiving an authentication response. In response to activation by client application 304, web browser application 306 can access an authentication file containing part of the authentication token and executable instructions to generate the re-created authentication token. Web browser application 306 can then send the re-created authentication token to content management system 206, such as through an HTTP POST command. In response to the authentication request, web browser application 306 can receive an authentication response from content management server 206.

Figure 5:
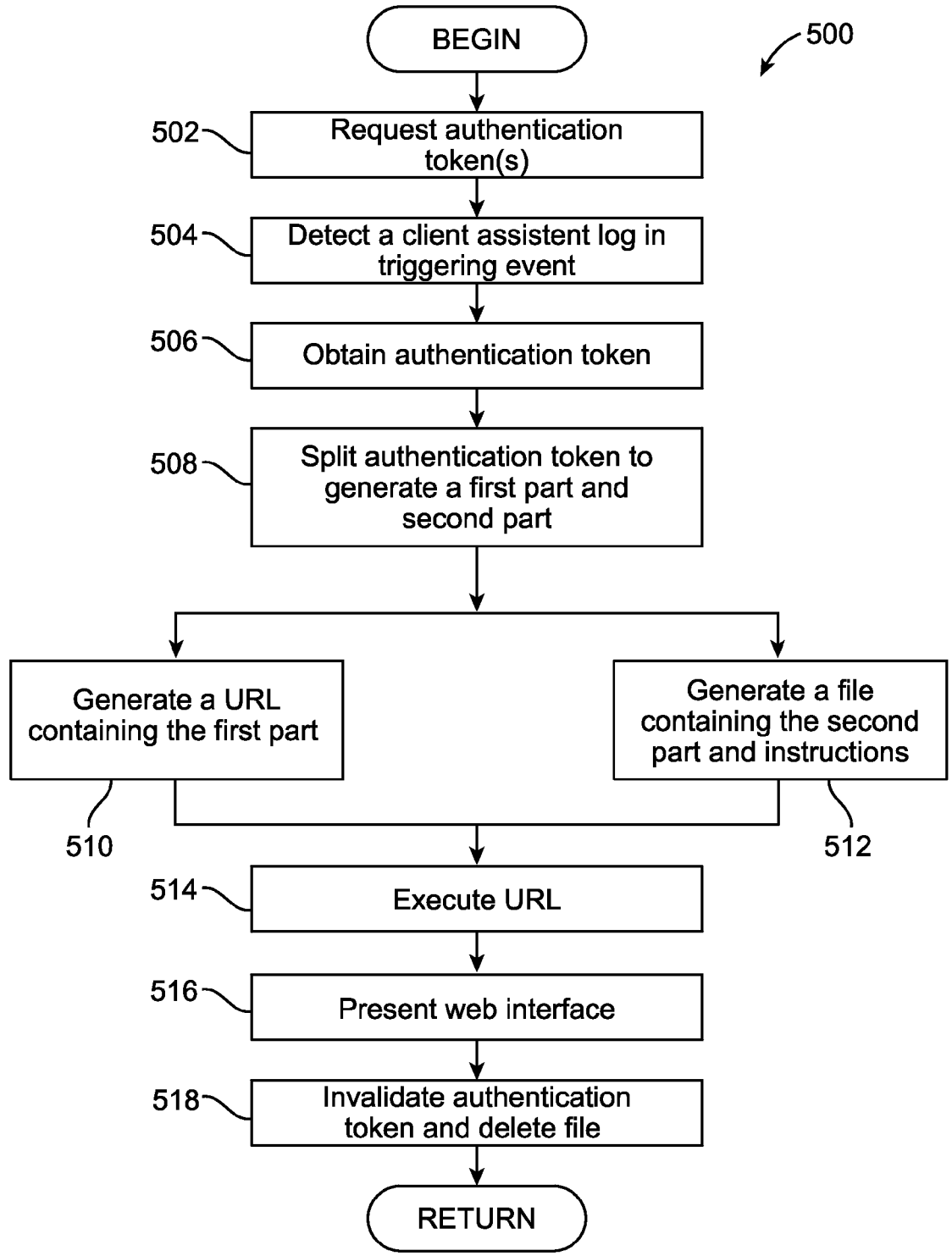
FIG. 5 shows a first exemplary method for logging a user in to a website using a native client application.

FIG. 5 is a flowchart showing steps in exemplary method 500 for logging a user in to a website using a native client application. For the sake of clarity, this method is discussed in terms of exemplary client device $202_i$ in FIG. 3. Although specific steps are show in FIG. 5, in other embodiments a method can have more or less steps.

At some point client application 304 can request one or more authentication tokens (502). When and how many tokens client application 304 requests can vary with the configuration of the system. For example, client application 304 can request one or more tokens when a token expires or is used, or when the number of available tokes reaches some predefined minimum value. Client application 304 can also be configured to request a token when client application assisted user log in is triggered. After receiving the one or more requested authentication tokens, client application 304 can store the tokens, such as in token storage 310.

At some point client application 304 can detect a client assisted user log in triggering event (504). A client assisted user log in triggering event can include such actions as a web interface triggering action, e.g. request to share a content item or to generate a content item share link; or a user navigation event, e.g. the user navigating to the content management system's website.

In response to detecting a client assisted user log in triggering event, client application 304 can obtain a one-time use authentication token (506), such as from token storage 310 or by requesting a token from content management system 206. In some cases, after selecting an authentication token, client application 304 can check that the selected authentication token is still valid, such as by verifying that the token has not expired. Once client application 304 has obtained an authentication token, client application 304 can split the authentication token into multiple parts (508). For example, client application 304 can split the authentication token into two parts using a secret sharing algorithm.

After splitting the authentication token, client application 304 can generate an authentication URL containing one part of the authentication token (510). Client application 304 can also generate an authentication file containing the other part of the authentication token and web browser executable instructions (512). Whether client application 304 generates the URL and file sequentially or in parallel can vary with the configuration of the system, as can the order in which the URL and file are generated, when generated sequentially.

Once the URL and file have been created, client application 304 can forward the URL to web browser application 306 where the URL can be executed (514). The URL can be generated such that when web browser application 306 executes the URL, web browser application 306 is directed to the authentication file. Web browser application 304 can then execute the instructions contained in the authentication file in order to re-create the authentication token and send the authentication token to content management system 206. For example, the file can contain JavaScript instructions that recombine the parts and call the HTTP POST method. The POST method can transfer the re-created authentication token to content management system 206.

In response to sending the re-created authentication token, web browser application 306 can receive an authentication message, such as success or failure. Web browser application 306 can present a web interface (516) in accordance with whether the authentication succeeded or not. For example, upon successful authentication, the web interface can be the requested content. However, upon a failed authentication, the web interface can be a log in window, an access denied window, or some other window indicating the authentication failed.

After the attempted log in, client application 304 can invalidate the authentication token and delete the authentication file (518). For example, client application 304 can delete the authentication token or mark it as invalid or used. After invalidating the authentication token and deleting the authentication file, client device 202$_i$ can resume previous processing, which can include repeating method 500.

Figure 6:
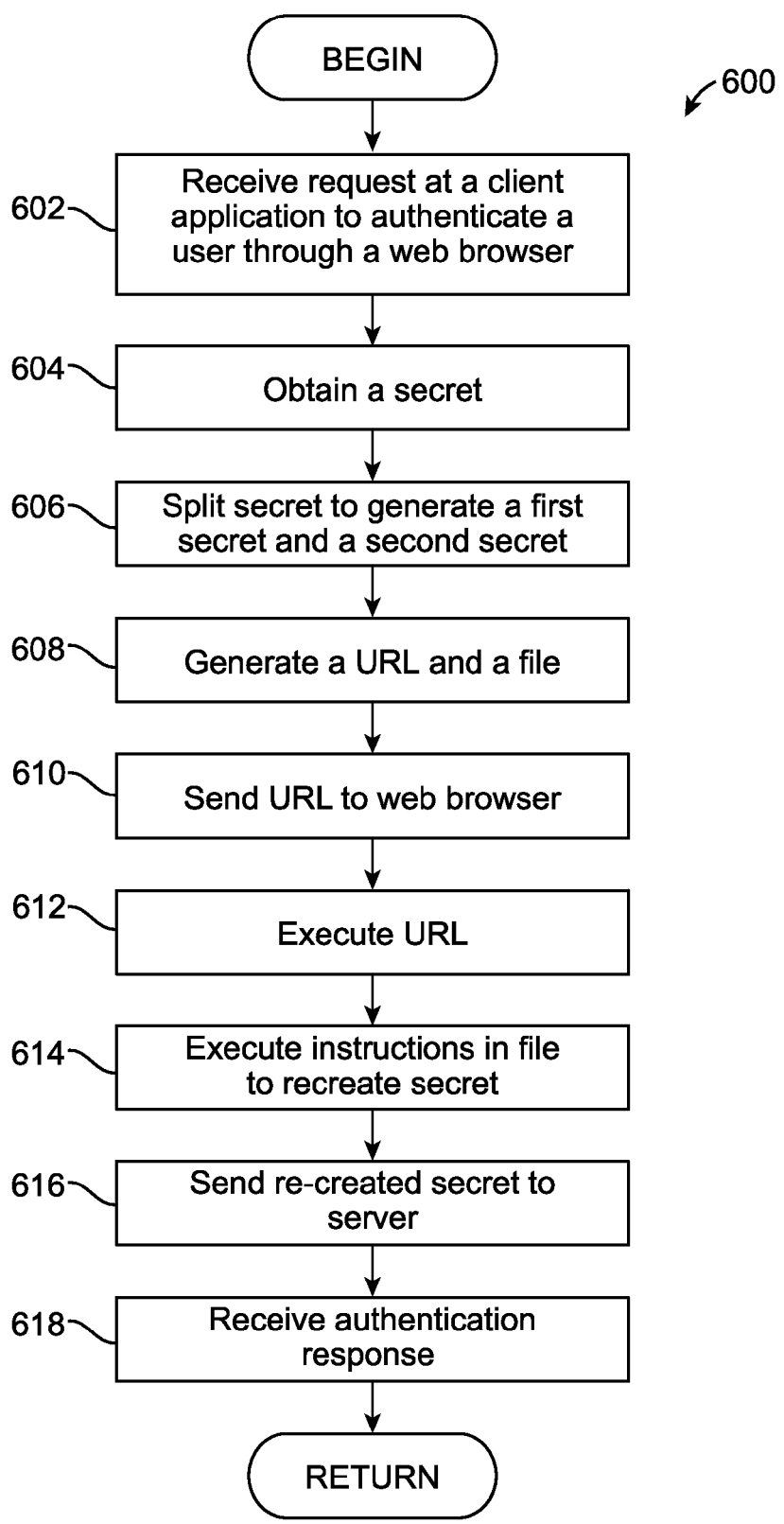
FIG. 6 shows a second exemplary method for logging a user in to a website using a native client application.

FIG. 6 is a flowchart showing steps in exemplary method 600 for logging a user in to a website using a native client application. For the sake of clarity, this method is discussed in terms of exemplary client device 202$_i$ in FIG. 3. Although specific steps are show in FIG. 6, in other embodiments a method can have more or less steps.

At some point client application 304 can receive a request to authenticate a user through a web browser (602). In some cases, a client assisted user log in triggering event, such as a web interface triggering action or a user navigation action, can trigger the request. In response to receiving the authentication request, client application 304 can obtain a one-time use secret (604), such as an authentication token from token storage 310 or by requesting a secret from content management system 206. In some cases, after selecting a secret, client application 304 can check that the selected secret is still valid, such as by verifying that the secret has not expired.

Once client application 304 has obtained the secret, client application 304 can split the secret into a first secret and a second secret (606). For example, client application 304 can split the secreting into two parts using a secret sharing algorithm.

After splitting the secret, client application 304 can generate an authentication URL and an authentication file (610). The authentication URL can contain one part of the secret, such as the first secret. The authentication file can contain the other part of the secret, such as the second secret, and web browser executable instructions. Whether client application 304 generates the URL and file sequentially or in parallel can vary with the configuration of the system, as can the order in which the URL and file are generated, when generated sequentially.

Additionally, which part of the secret is placed in the URL and the file can vary with the configuration and/or request. For example, in response to a first request the client application may place the first part in the URL, an in response to a second request the client application may place the second part in the URL. Furthermore, in some cases the decision can be random. However, regardless of which piece is placed where, the client application generated instructions have to be able to combine the pieces to re-create the secret.

Once the URL and file have been created, client application 304 can send the URL to web browser application 306 (610) where the URL can be executed (612). The URL can be generated such that when web browser application 306 executes the URL, web browser application 306 is directed to the authentication file. Web browser application 304 can then execute the instructions contained in the authentication file in order to re-create the secret (616) and send the re-created secret to content management system 206 (616). For example, the file can contain JavaScript instructions that recombine the parts and call the HTTP POST method. The POST method can transfer the re-created secret to content management system 206.

In response to sending the re-created authentication token, web browser application 306 can receive an authentication response (618). The response can vary depending on whether the authentication succeeded or not. For example, upon successful authentication, web browser application 306 can receive the requested content. However, upon a failed authentication, web browser application 306 can receive data for a log in window, an access denied window, or some other window indicating the authentication failed. After receiving the authentication response, client device 202$_i$ can resume previous processing, which can include repeating method 600.

Figure 7:
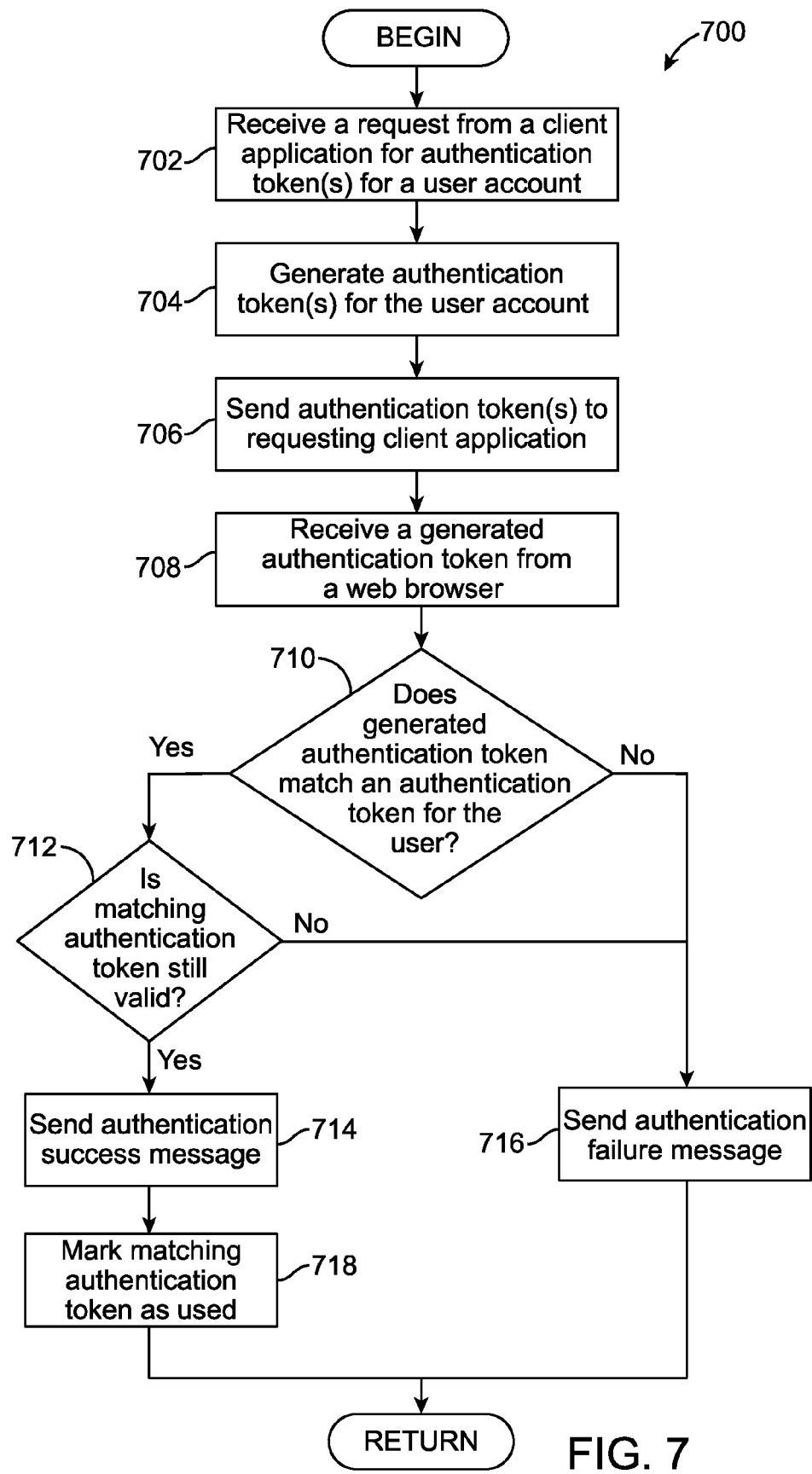
FIG. 7 shows a third exemplary method for logging a user in to a website using a native client application.

FIG. 7 is a flowchart showing steps in exemplary method 700 for logging a user in to a website using a native client application. For the sake of clarity, this method is discussed in terms of exemplary content management system 206 in FIG. 2. Although specific steps are show in FIG. 7, in other embodiments a method can have more or less steps.

At some point, content management system 206 can receive a request from a client application for one or more authentication tokens for a user account (702). In response to the request, content management system 206 can generate one or more authentication tokens for the user account (704) and send the tokens to the requesting client application (706). The number and/or type of authentication tokens generated by content management system 206 can vary with the configuration of the system. For example, content management system 206 may be configured to limit the number of outstanding valid authentication tokens. In this case, content management system 206 can determine the difference between the number of token outstanding for the user and the maximum allowed. If the number requested is greater than the difference, content management system 206 can send the number that will bring the client application to the maximum permitted.

At some later point, content management system 206 can receive a generated authentication token from a web browser (708) for authentication. In response to receiving the generated authentication token, content management system 206 can check if the authentication token matches an authentication token associated with the user (710). If a matching authentication token is found, content management system 206 can verify that the matching token is still valid (712). For example, content management system 206 can check if the token has expired or is marked as already used. If the matching authentication token is valid, content management system 206 can send an authentication success response (714), which can include sending user data. After sending the success response, content management system 206 can mark the matching authentication token as used.

If content management system 206 cannot find a matching authentication token or the matching authentication token is invalid, content management system 206 can send an authentication failure response (716). An authentication failure response can include data for a log in window, an access denied window, or some other window indicating the authentication failed. After marking the matching authentication token as used or sending an authentication failure message, content management system 206 can resume previous processing, which can include repeating method 700.

FIG. 8A, and FIG. 8B show exemplary possible system embodiments. The more appropriate embodiment will be apparent to those of ordinary skill in the art when practicing the present technology. Persons of ordinary skill in the art will also readily appreciate that other system embodiments are possible.

FIG. 8A shows a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B shows a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system on a client device for logging a user into a website using a native client application, the system comprising:
   a hardware processor;
   a first module configured to control the hardware processor so that the client application obtains an authentication token in response to detecting a user log in triggering event, the authentication token comprising data to authenticate the user to a server;
   a second module configured to control the hardware processor so that the client application splits the authentication token to generate a uniform resource locator (URL) and a file, the URL comprising a first part of the token, the file comprising a second part of the token and a set of web browser executable instructions; and
   a third module configured to control the hardware processor so that a web browser application executes the URL, the URL redirecting execution to the set of instructions in the file, wherein the set of instructions combine the first part and the second part to re-create the token and transmit the re-created token to the server to authenticate the user by matching the re-created token with an authentication token associated with the user.

2. The system of claim 1 further comprising:
   a fourth module configured to control the hardware processor to apply a secret sharing algorithm to the token to generate the first part and the second part.

3. The system of claim 1, wherein the user log in triggering event includes a web interface triggering action detected by the client application.

4. The system of claim 3 further comprising:
   a fourth module configured to control the hardware processor to present a web interface, the web interface displaying a user interface corresponding to the web triggering action comprising data from an account for the user.

5. The system of claim 1 further comprising:
   a fourth module configured to control the hardware processor to receive an authentication failed message when the re-created token fails to match the authentication token.

6. The system of claim 1 further comprising:
   a fourth module configured to control the hardware processor to invalidate the authentication token after transmitting the re-created token.

7. The system of claim 1, wherein the authentication token expires after a predefined period of time.

8. The system of claim 1, wherein transmitting the re-created token to authenticate the user comprises executing a hypertext transfer protocol (HTTP) post method.

9. The system of claim 1, wherein the authentication token is a one-use token.

10. A computer-implemented method executed on a client device for logging a user into a website using a native client application, the method causing a hardware processor on the client device to:
    receive, by the client application and from a server, a secret in response to detecting a user log in triggering event, the secret generated on the server as an authentication token linked to a user account;
    split, by the client application, the secret to generate a first part and a second part; generate, by the client application, a file comprising the first part and web browser executable instructions, which when executed combine the first part and the second part to re-create the secret and send the re-created secret to the server;

generate, by the client application, a uniform resource locator (URL) including the second part;

execute, by a web browser application via the hardware processor, the URL, wherein the URL redirects execution to the instructions in the file;

execute, by the web browser application, the instructions in the file to re-create the secret; and send the re-created secret to the server to authenticate the user by matching the re-created secret with a secret linked to the user account.

11. The method of claim 10, wherein the splitting, generating, and executing occur in response to a web interface triggering action.

12. The method of claim 11 further comprising:
when the re-created secret matches the secret, presenting a web browser window displaying a user interface corresponding to the web triggering action comprising data from the user account; and
when the re-created secret differs from the secret, presenting a web browser window indicating authentication failed.

13. The method of claim 12, wherein the web browser window indicating authentication failed includes user interface elements for accepting a username and a password.

14. The method of claim 10, wherein the instructions are JavaScript instructions.

15. The method of claim 10, wherein the re-created secret authenticates a user of the user account when the re-created secret matches the secret generated on the server.

16. The method of claim 10 further comprising:
deleting the file after a first predefined period of time; and
invalidating the secret after sending the re-created secret to the server.

17. A client device enabled to log a user into a website using a native client application, the client device comprising:
a hardware processor;
a memory configured to store the client application and a web browser application, the client application linked to a user authenticated with a server;
a first module configured to control the hardware processor to receive a request to authenticate the user for access to data on the server through the web browser application, the request received from the client application in response to the client application detecting a user log in triggering event;
a second module configured to control the hardware processor so that the client application obtains and splits an authentication token to generate a uniform resource locator (URL) and a file, the URL comprising a first secret, the file comprising a second secret and a set of web browser executable instructions, wherein the first secret and the second secret are each part of the split authentication token, which is a one-time use authentication token;
a third module configured to control the hardware processor to execute the URL in the web browser application, wherein executing the URL causes the web browser application to execute the set of instructions in the file, wherein the set of instructions combine the first secret and the second secret to generate the authentication token and transmit the authentication token to the server to match the transmitted token with an authentication token associated with the user, whereby automatically authenticating the user to access data on the server through the web browser application.

18. The client device of claim 17, wherein the user log in triggering event includes a web interface triggering action detected by the client application.

19. The client device of claim 18, wherein the web interface triggering action is at least one of a request to generate a file sharing link or a request to share a folder.

20. The client device of claim 17, wherein the authentication token is generated by the server.

21. The client device of claim 17, wherein the server is a synchronized online content management system.

22. A synchronized online content management system for logging a user into a website using a native client application, the system comprising:
a hardware processor;
a first module configured to control the hardware processor to send a batch of a plurality of authentication tokens for a user account to the client application executing on a client device, the client application authenticated and authorized to access data in the user account;
a second module configured to control the hardware processor to receive a generated authentication token from a web browser executing on the client device;
a third module configured to control the hardware processor to verify the generated authentication token matches an authentication token in the plurality of authentication tokens, wherein the generated authentication token was generated by a web browser application executing on the client device by combining parts of a sent authentication token that was split into a first part and second part, wherein the sent authentication token was obtained by the client application in response to detecting a user log in triggering event, wherein the sent authentication token was split by the client application so that a uniform resource locator (URL) and a file were generated, the URL comprising the first part of the token, the file comprising the second part of the token and a set of web browser executable instructions, wherein the web browser application combined the parts by executing the URL, the URL redirecting execution to the set of instructions in the file, wherein the set of instructions combine the first part and the second part to re-create the sent authentication token; and
a fourth module configured to control the hardware processor to send an authentication message to the client device based on the verification.

23. The synchronized online content management system of claim 22, wherein each authentication token is assigned an expiration date, and wherein verifying the generated authentication token further comprises:
checking the expiration date assigned to the matching authentication token is valid.

24. The synchronized online content management system of claim 22 further comprising:
a fifth module configured to control the hardware processor to mark the matching authentication token as used.

* * * * *